July 5, 1955     L. LIPSON     2,712,458

PIPE COUPLINGS

Filed June 5, 1950

INVENTOR.
LEONARD LIPSON
BY
ATTORNEYS

United States Patent Office 2,712,458
Patented July 5, 1955

2,712,458
PIPE COUPLINGS

Leonard Lipson, Philadelphia, Pa.

Application June 5, 1950, Serial No. 166,181

2 Claims. (Cl. 285—120)

(Granted under Title 35, U. S. Code (1952), sec. 266)

The invention described herein may be manufactured and used by or for the Government of the United States of America for governmental purposes without the payment of any royalties thereon or therefor.

This invention relates to improvements in pipe couplings, and more particularly pertains to improvements in self-sealing couplings for hydraulic conduits.

It has been conventional practice to tighten the nut fittings used to couple sections of pipe by means of a wrench, effecting a seal between adjacent sections by forcing the valve defined by one section against the valve seat defined by the other section. Seal effectiveness has been increased by providing suitable gaskets therebetween. However, particularly where frequent making and breaking of the coupling, as is involved in the testing of a series of hydraulic units, is required, such practices have proven to be excessively time-consuming and inefficient. Leakage has occurred by reason of the failure of workmen to tighten the fitting sufficiently, or by reason of the loss of seal effectiveness when the valve or valve seat has been scored as the result of the application of excessive torques in tightening.

The subject device overcomes these disadvantages of the prior art structures by providing a fluid-tight coupling that can be secured in operative position by finger manipulation only, cannot be loosened readily when the system is under pressure, and can be released readily and facilely by like finger manipulation, without the use of wrenches or the like, when pressure has been released from the system.

The primary object of this invention is to provide a novel pipe coupling adapted to afford an effective seal between adjacent conduits.

Another object is to provide a self-sealing coupling for hydraulic conduits.

A further object is to provide a self-sealing hydraulic coupling that can be secured or removed from a conduit readily and facilely by manual manipulation, without the employment of wrenches and the like.

Still another object is to provide a self-sealing hydraulic coupling having a valve and valve seat that will not wear and score or lose seal effectiveness in normal use.

Figure 1:
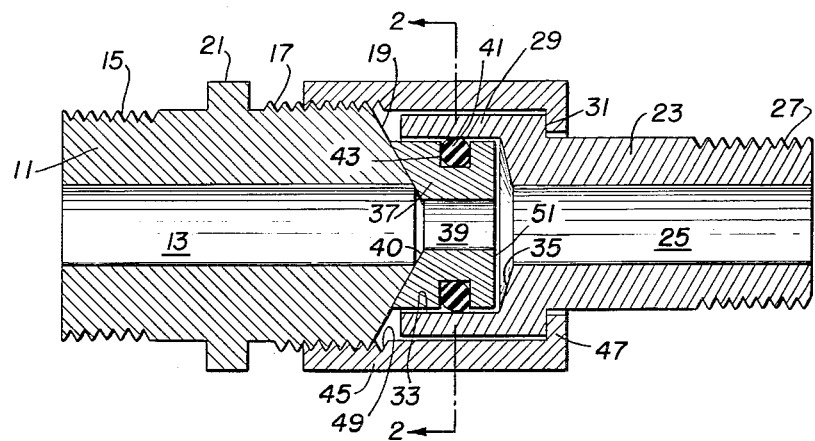
Figure 2:
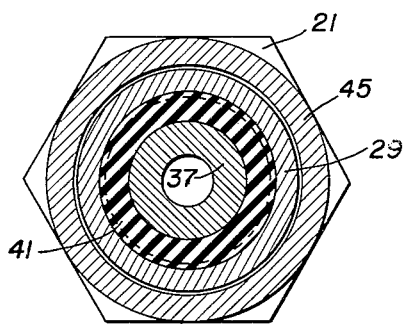

Other objects and many of the attendant advantages of this invention will be readily appreciated as the same becomes better understood by reference to the following detailed description when considered in connection with the accompanying drawings wherein:

Fig. 1 is a central longitudinal section of a pipe coupling, showing a preferred embodiment of the invention; and Fig. 2 is a section taken on the line 2—2 of Fig. 1.

Similar numerals refer to similar parts throughout the several views.

The embodiment of the invention shown in the drawing comprises a connector 23, a connector 11, a sealing device between the connectors that embodies a cylinder 33 and a plunger or piston 37 operating in the cylinder, and a union 45 exteriorly of the sealing device by means of which the connectors are secured to each other. The several connectors 11 and 23 are adapted for connection to pipe ends, not shown, that are to be connected to each other in a line of fluid under pressure. Connector 23 is adapted for connection to the pipe end of the high-pressure side of the line, sometimes termed the pressure or supply side. Connector 11 is adapted for connection to the pipe end of the low-pressure side, sometimes termed the exhaust or back-pressure side.

Connector 11 is a fitting that comprises an axial bore or passageway 13 for flow of fluid under pressure, bore 13 being of a size that corresponds with the fluid line to be coupled. External threads 15 at one end of connector 11 preferably constitute standard pipe threads for attaching the connector to a standard pipe line at its end. At its opposite end, connector 11 comprises external threads 17, which fit the internal threads 49 of union 45. Between the threads 15 and 17 along its body, connector 11 comprises flange 21, which constitutes an integral nut for attaching the connector to a pipe in the usual manner, by means of a wrench for example.

The other connector or fitting 23 comprises the axial bore or passageway 25, which also is of a size to correspond with the fluid line. External threads 27 at one end of connector 23 also constitute standard pipe threads, which enable this connector also to be connected to a pipe line in the usual manner. In use, connector 23 is attached to a fluid line constituting a source of fluid under pressure, which enters passage 25 for flow through the coupling. Thus, connector 23 always is connected at the high-pressure side of the fluid line, and connector 11 to the back-pressure side.

At its opposite end remote from threads 27, connector 23 comprises the enlarged barrel 29, which provides a shoulder 31 of connector 23 against which flange 47 of sleeve nut or union 45 is adapted to bear. Barrel 29 of connector 23 comprises the bore 33, which is coaxial with bore 25, and of larger diameter than the fluid line with which the bores 25 and 13 correspond. Bore 33 constitutes a cylinder in which the plunger or piston 37 operates.

Plunger 37 comprises the sealing ring 41, which is seated in the annular groove 43 of the plunger, and which operates in the manner of a piston ring. The face 51 at the high-pressure end of plunger 37 is squared to constitute a piston face, against which fluid under pressure operates to actuate the plunger to the left in Fig. 1. Inside cylinder 33, surface 35 constitutes a bevelled end face of the cylinder at its high-pressure end, and forms a cavity for fluid under pressure between piston face 51 and surface 35, constituting a pressure chamber.

At the opposite or low-pressure end of plunger 37, end surface 40 is bevelled frusto-conical, and is contoured to match and fit the companion end face 19 of connector 11. Frusto-conical end surface 19 is at the inboard end of its connector 11 proximate to cylinder 33, and nearer to the high-pressure end of the coupling. Fluid under pressure, in the cavity between piston face 51 and face 35 of cylinder 33, actuates plunger 37 to the left in Fig. 1 to press its bevelled end surface 40 into sealing engagement with companion end surface 19 of connector 11.

Plunger 37 comprises the axial bore or passageway 39, which is coaxial with both bores 25 and 13 of respective connectors 23 and 11 when the coupling is connected, and permits the flow of fluid through the coupling of the invention, from the high-pressure end of connector 23 towards and through connector 11 at the low-pressure end. The diameter of bore 39 is less than the diameter of bores 25 and 13, and is restricted with reference to the fluid line that is connected by the coupling of the invention. By passage 39 being restricted, a pressure build-up is generated in the cavity between surface 35 of connector 23 and the piston face 51 of the plunger 37, which acts against the plunger to press sealing surface 40 thereof into sealing engagement with the companion surface 19 of connector 11.

The coupling of the invention may be used to connect a source of fluid under pressure to a pressure fluid system. Connector 11 is connected to the pipe end of a pressure-fluid system by means of threads 15. With plunger 37 in cylinder 33, and union 45 positioned on connector 23, the connector 23 is attached to the pipe end of the fluid-pressure source by means of threads 27. Union 45 constitutes a sleeve nut exteriorly of the sealing device of plunger 37 in cylinder 33. Threads 49 of union 45 are engaged with threads 17 of connector 11 by rotating the union. Flange 47 of union 45 engages shoulder 31 of connector 23, to draw connector 23 towards connector 11, and thereby connect the coupling, the connection being completed by union 45 being tightened manually. Any pressure build-up exteriorly of the seal of plunger 37 in its cylinder 33, which actuation of plunger 37 towards connector 11 will tend to produce, is vented through threads 17 and 49, which are loose enough according to usual thread construction to prevent a pressure pocket from forming.

When the pressure fluid source is turned on, by means of a valve for example, to permit fluid under pressure to flow into passage 25 and through the coupling, a pressure build-up occurs in the pressure chamber between piston face 51 and surface 35, due to the restricted nature of passage 39 through plunger 37. Plunger 37 is actuated to the left in Fig. 1, pressing its sealing surface 40 into sealing engagement with companion surface 19 of connector 11. Sealing engagement between companion sealing surfaces 19 and 49, and the sealing ring 41, operate to seal the coupling against leakage of fluid from the fluid line through the union 45 and out of the union at either or both of its ends.

The coupling of the invention may be connected and disconnected by manual rotation of union 45.

Obviously many modifications and variations of the present invention are possible in the light of the above teachings. It is therefore to be understood that within the scope of the appended claims the invention may be practiced otherwise than as specifically described.

I claim:
1. A coupling comprising a connector for each of pipe ends to be connected in a line of fluid under pressure, a sealing device between the connectors and a union exteriorly of the sealing device to secure the connectors to each other, one connector being adapted for connection to the pipe end of the high-pressure fluid side of the line and the other connector being adapted for connection to the pipe end of the back-pressure side, the sealing device comprising a cylinder larger than the bore of the fluid line and coaxial therewith, the sealing device also comprising a plunger operable in the cylinder in sealed engagement with the wall thereof, the plunger comprising a piston face that is squared at its end on the high-pressure side, a bevelled sealing face at its end on the back-pressure side and an axial bore from end to end that is smaller than the bore of the fluid line, the connector of the back-pressure side comprising a bevelled face at its end proximate to the cylinder and companion to the bevelled face of the plunger for sealing engagement therewith, and the connector of the pressure side comprising a bevelled face inside the cylinder to constitute an end of face thereof and provide a pressure-fluid cavity contained by the cylinder between the end face thereof and the piston face of the plunger.

2. In a coupling as defined in claim 1, the union comprising a screw-threaded engagement that permits its rotation with reference to the several connectors held stationary.

References Cited in the file of this patent
UNITED STATES PATENTS

| | | |
|---|---|---|
| 797,796 | Devlin | Aug. 22, 1905 |
| 1,094,267 | Sullivan | Apr. 21, 1914 |
| 1,162,319 | Southworth | Nov. 30, 1915 |
| 1,619,328 | Benckenstein | Mar. 1, 1927 |
| 1,697,314 | Gresser | Jan. 1, 1929 |
| 1,830,674 | Peck | Nov. 3, 1931 |
| 2,506,286 | Wittlin | May 2, 1950 |
| 2,629,403 | Allen | Feb. 24, 1953 |

FOREIGN PATENTS

| | | |
|---|---|---|
| 290,415 | Italy | Nov. 18, 1931 |